US010621113B2

(12) United States Patent
Byrne et al.

(10) Patent No.: US 10,621,113 B2
(45) Date of Patent: *Apr. 14, 2020

(54) INFORMATION AND CONTROL VIA VOICE COMMUNICATIONS MODULE FOR WORK SURFACE POWER AND DATA UNITS

(71) Applicant: Norman R. Byrne, Ada, MI (US)

(72) Inventors: Norman R. Byrne, Ada, MI (US); Joseph D. Ward, Grand Rapids, MI (US); Randell E. Pate, Jenison, MI (US); Robert Craig Klem, Rockford, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,619

(22) Filed: Jan. 8, 2019

(65) Prior Publication Data
US 2019/0138461 A1 May 9, 2019

Related U.S. Application Data

(63) Continuation-in-part of application No. 15/499,301, filed on Apr. 27, 2017, now Pat. No. 10,175,996.

(60) Provisional application No. 62/701,528, filed on Jul. 20, 2018, provisional application No. 62/330,492, filed on May 2, 2016.

(51) Int. Cl.
| | |
|---|---|
| *G06F 13/10* | (2006.01) |
| *G06F 3/16* | (2006.01) |
| *H01R 33/92* | (2006.01) |
| *H01R 13/516* | (2006.01) |
| *G06F 1/18* | (2006.01) |
| *H01R 13/66* | (2006.01) |
| *G06F 1/16* | (2006.01) |
| *H01R 25/00* | (2006.01) |

(52) U.S. Cl.
CPC ............ *G06F 13/102* (2013.01); *G06F 3/167* (2013.01); *H01R 13/516* (2013.01); *H01R 33/92* (2013.01); *G06F 1/1601* (2013.01); *G06F 1/181* (2013.01); *G06F 1/189* (2013.01); *G06F 2213/3854* (2013.01); *H01R 13/665* (2013.01); *H01R 25/006* (2013.01)

(58) Field of Classification Search
None
See application file for complete search history.

(56) References Cited

U.S. PATENT DOCUMENTS

| | | |
|---|---|---|
| 7,177,798 B2 | 2/2007 | Hsu et al. |
| 8,480,429 B2 | 7/2013 | Byrne |
| 8,543,407 B1 | 9/2013 | Gagnon et al. |
| 8,677,377 B2 | 3/2014 | Cheyer et al. |

(Continued)

*Primary Examiner* — Idriss N Alrobaye
*Assistant Examiner* — Dayton Lewis-Taylor
(74) *Attorney, Agent, or Firm* — Gardner, Linn, Burkhart & Ondersma LLP

(57) ABSTRACT

An electrical power and/or electronic data unit with voice communications capability includes a housing, a voice communications module, and an electrical power outlet coupled to the housing. The voice communications module is coupled to the housing and includes an audio speaker, a microphone, an audio signal receiver/processor, and an audio signal generator. The audio signal receiver/processor is configured to receive and process vocalized speech from a user. The voice communications module is configured to generate an audible response via the audio signal generator and the speaker, responsive to receiving and processing the vocalized speech from the user. The voice communications module is in electronic communication with a data source.

20 Claims, 11 Drawing Sheets

(56) References Cited

U.S. PATENT DOCUMENTS

| | | |
|---|---|---|
| 9,300,347 B1 | 3/2016 | Coverstone |
| 9,312,673 B2 | 4/2016 | Byrne et al. |
| 10,008,816 B2 | 6/2018 | Byrne et al. |
| 10,070,736 B2 | 9/2018 | Byrne et al. |
| 10,175,996 B2 | 1/2019 | Byrne et al. |
| 2005/0240346 A1 | 10/2005 | Lin |
| 2007/0049197 A1 | 3/2007 | Klein |
| 2007/0206629 A1 | 9/2007 | Choi |
| 2009/0097363 A1 | 4/2009 | Nyberg |
| 2009/0215501 A1 | 8/2009 | Kim |
| 2010/0022220 A1 | 1/2010 | Gupta et al. |
| 2011/0072083 A1 | 3/2011 | Suetsugu |
| 2011/0096138 A1 | 4/2011 | Grimshaw |
| 2013/0176738 A1 | 7/2013 | Tinaphong et al. |
| 2013/0207778 A1 | 8/2013 | Neafsey et al. |
| 2013/0231161 A1 | 9/2013 | Hsu et al. |
| 2014/0053185 A1 | 2/2014 | Bleacher et al. |
| 2014/0188485 A1 | 7/2014 | Kim et al. |
| 2014/0359712 A1 | 12/2014 | Takayama |
| 2015/0088331 A1 | 3/2015 | Fiedler |
| 2015/0110324 A1 | 4/2015 | Feng et al. |
| 2015/0332580 A1 | 11/2015 | Bokhary |
| 2016/0112988 A1 | 4/2016 | Lee |
| 2016/0174347 A1 | 6/2016 | Parello et al. |
| 2016/0224064 A1 | 8/2016 | Fleisig |
| 2016/0300403 A1 | 10/2016 | Harter et al. |
| 2016/0300404 A1 | 10/2016 | Harter et al. |
| 2016/0300407 A1 | 10/2016 | Harter et al. |
| 2016/0309307 A1 | 10/2016 | Agarwal et al. |
| 2017/0038739 A1 | 2/2017 | Nakamura et al. |
| 2017/0251356 A1 | 8/2017 | Andrade et al. |
| 2017/0316659 A1 | 11/2017 | Byrne et al. |

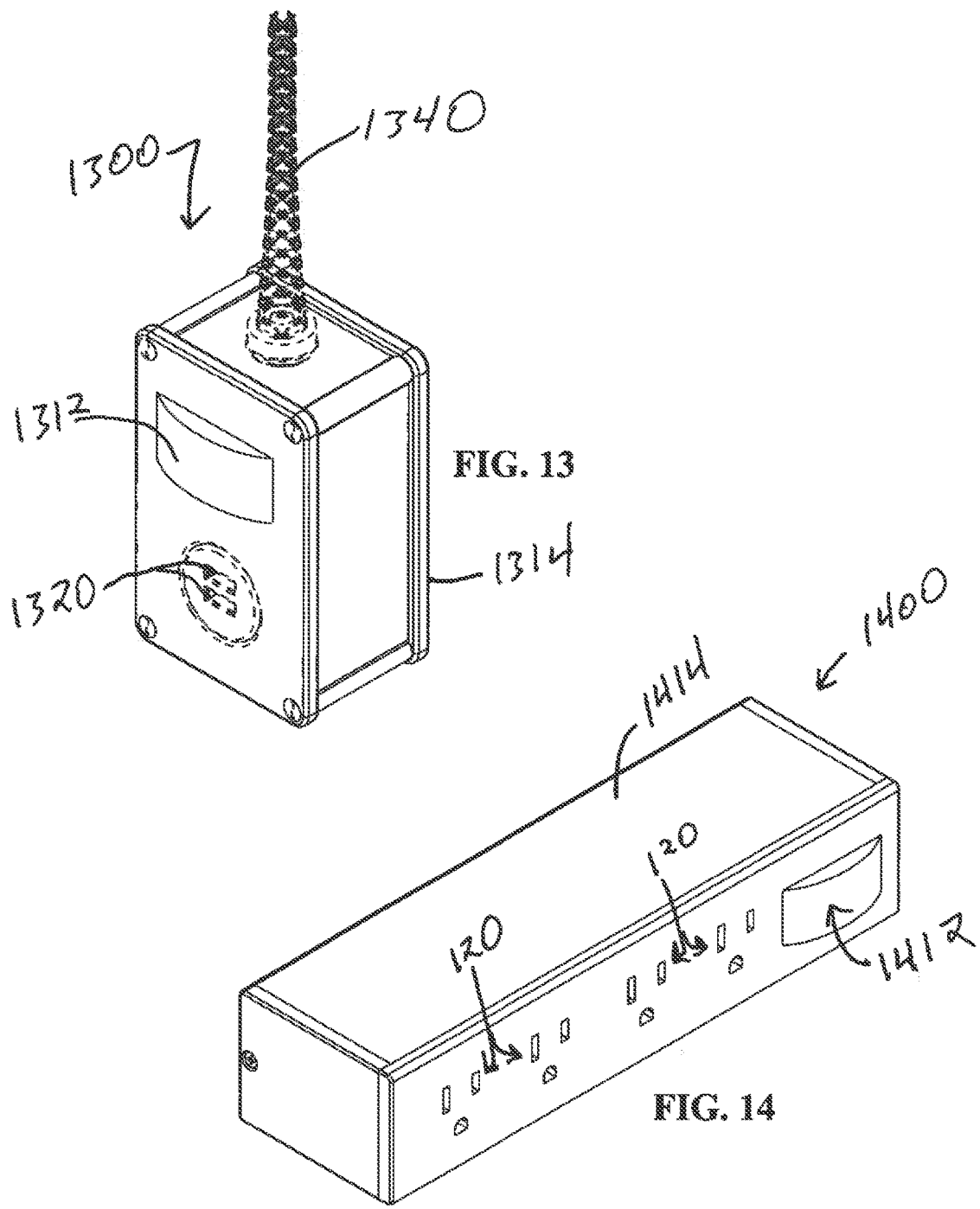

INFORMATION AND CONTROL VIA VOICE COMMUNICATIONS MODULE FOR WORK SURFACE POWER AND DATA UNITS

CROSS REFERENCE TO RELATED APPLICATIONS

The present application is a continuation-in-part of U.S. patent application Ser. No. 15/499,301, filed Apr. 27, 2017, now U.S. Pat. No. 10,175,996, which claims the filing benefits of U.S. provisional application, Ser. No. 62/330,492, filed May 2, 2016; the present application also claims the filing benefits of U.S. provisional application, Ser. No. 62/701,528, filed Jul. 20, 2018, which are all hereby incorporated herein by reference in their entireties.

FIELD OF THE INVENTION

The present invention is directed to furniture-integrated power and data channel systems, and more particularly to accessories mounted into power and data channel systems.

BACKGROUND OF THE INVENTION

Conventional power and data systems provide a variety of interconnections and flexibility. Power and data systems may be embedded into walls and integrated into and/or onto furniture, such as office furniture. These embedded and integrated power and data systems typically include outlets or other similar ports arranged into receptacles for mounting into the power and data systems. Example outlets and ports include: high voltage AC outlets, phone ports, low-voltage DC outlets, and USB ports, and their respective assemblies, housings, or housing units.

SUMMARY OF THE INVENTION

The present invention provides for an electronic device assembly that includes a display screen and/or audio communications with associated electronics that provide interactive functionality, which includes, for example, text messaging, time-keeping, calendar functionalities, calculations, game-playing, and audio/video media playback. When this electronic device assembly is communicatively coupled with one or more peripheral devices, the electronic device assembly is able to provide additional interactive functionality, which includes, for example, interactive enterprise functionality and control. Optionally, such enterprise functionality and control may be accessed via voice/audio control functions. Furthermore, when the electronic device assembly is additionally or alternatively communicatively coupled to a personal computing device, such as a cellphone, the interactive display of the electronic device assembly can mirror the display of the cellphone, allowing a user to interact with their cellphone.

In one form of the present invention, an exemplary electronic device assembly that includes a display screen and associated electronics, is retained and supported by a housing body of a power and data unit. A plurality of these electronic device assemblies may be arranged in respective power and data units that are spaced throughout a work space. The electronic device assembly is coupled to at least one peripheral device. The display screen and associated electronics are configured to provide interactive control of the at least one peripheral at the display screen. The display screen is further configured to provide information that is communicated to the electronic device assembly from the at least one peripheral device.

In another form of the present invention, a method for providing interactive functionality between a peripheral device and an electronic device assembly retained and supported by a power and data housing assembly comprises communicating peripheral device configuration data from one or more peripheral devices to the electronic device assembly. One or more enterprise functions or controls are provided at the electronic device assembly via an interactive display screen, based upon the configuration data sent by the one or more peripheral devices. The enterprise functions or controls are provided via the interactive display screen of the electronic device assembly that is configured to provide interactive control of the one or more peripheral devices at the interactive display screen, and to further provide information at the interactive display screen that is sent from the one or more peripheral devices.

According to one aspect, electronics associated with the electronic device assembly may be adapted from "smartwatch" technology. The electronic device assembly may include an interactive digital display, such as a touch-sensitive display, capable of providing the user-interactive functions and enterprise functionality and control.

According to another aspect, the electronic device assembly may be wirelessly linked to one or more peripheral devices. Exemplary wireless links include one or more of Bluetooth, near field communications (NFC), and Wi-Fi networks. Such communications networks may also include Thread and/or Zigbee communications networks. The electronic device assembly may also be linked via a wired connection with the one or more peripheral devices. Optionally, the peripheral devices may include weather devices such as thermometers, barometers, rain sensors, and wind sensors. The peripheral devices may also include speakers and memory card interfaces. Optionally, the peripheral devices may comprise any electronic device capable of receiving and/or transmitting data to and/or from the electronic device assembly.

According to yet another aspect, the electronic device assembly's display may include a clock or watch face display. Optionally, the display of a portable computing device mirrors the interactive display of a particular electronic device assembly.

In still another aspect, the electronic device assembly is operable to serve as a remote control for the one or more peripheral devices.

In another form of the present invention, an electrical power and/or electronic data unit with voice communications capability includes a housing, a voice communications module, and an electrical power outlet coupled to the housing. The voice communications module is coupled to the housing and includes an audio speaker, a microphone, an audio signal receiver/processor, and an audio signal generator. The audio signal receiver/processor is configured to receive and process vocalized speech from a user. The voice communications module is configured to generate an audible response via the audio signal generator and the speaker, responsive to receiving and processing the vocalized speech from the user. The voice communications module is in electronic communication with a data source.

In an aspect of the present invention, the voice communications module is configured to provide audio interaction as defined by the processed vocalized speech. The audio interaction may be used to provide interactive functionality comprising at least one of: text messaging, time keeping, calendar functionalities, calculations, game-playing, audio-players, and video media players.

In a further aspect of the present invention, the voice communications module is communicatively coupled to, and configured to remotely control at least one peripheral device.

Therefore, the electrical power and/or electronic data unit with visual and/or audio communications capability provides interactive functionality that may include applications commonly found on smart phones, personal digital assistants, Internet-enabled voice-interactive devices, interactive enterprise functionality and control, and the like.

These and other objects, advantages, purposes and features of this invention will become apparent upon review of the following specification in conjunction with the drawings.

BRIEF DESCRIPTION OF THE DRAWINGS

FIG. 13 is a perspective view of another electrical power unit with voice communications module in accordance with an embodiment of the present invention;

FIG. 14 is an electrical power unit with voice communications module in accordance with an embodiment of the present invention;

DESCRIPTION OF THE PREFERRED EMBODIMENTS

Figure 1:
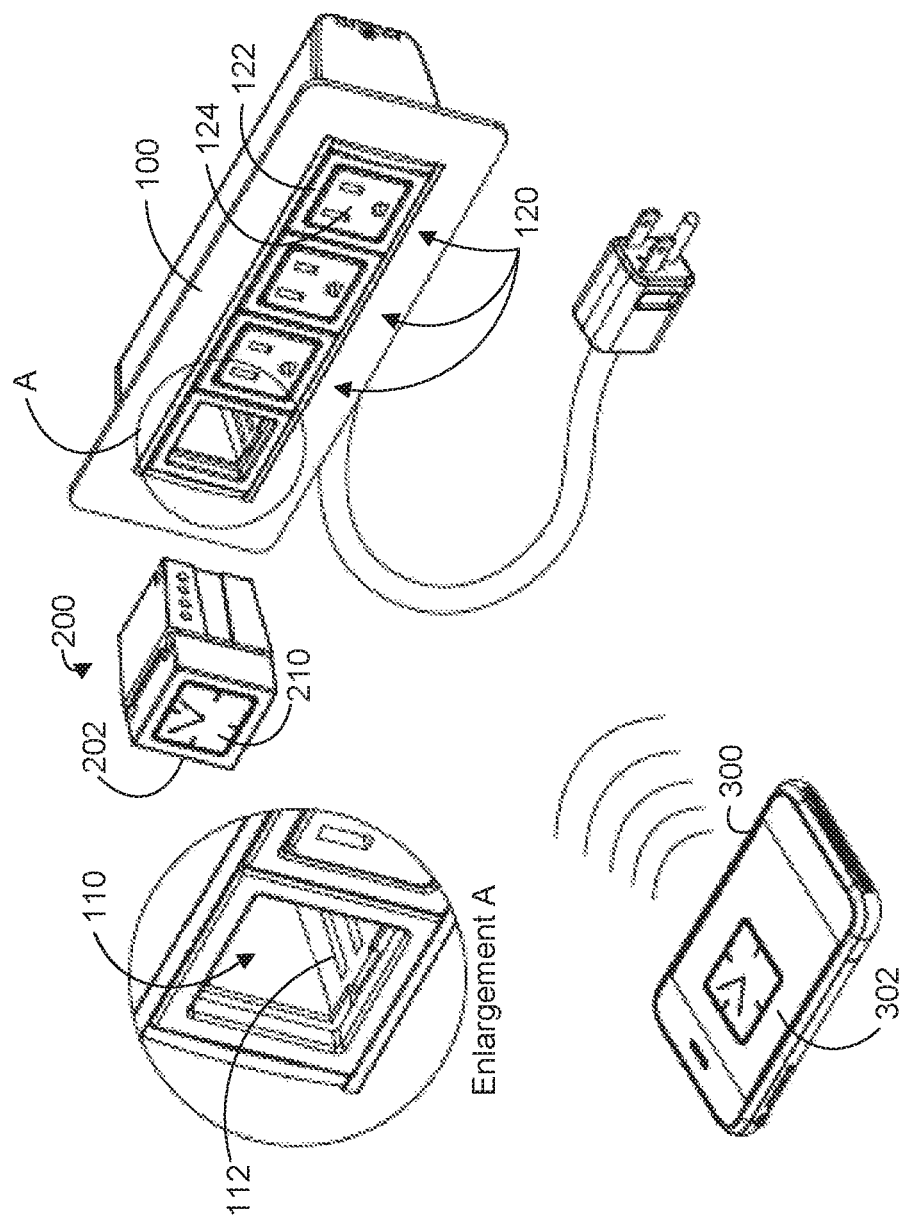
FIG. 1 is a perspective view of an information display and control system in accordance with an embodiment of the present disclosure.

Referring to the drawings and the exemplary embodiments depicted herein, electronic device assemblies are adapted to be retained and supported by power and data units that may be located in work areas or other locations. An exemplary electronic device assembly is configured to provide interaction functions that include text messaging, timekeeping, calendar functions, calculations, game-playing, and audio/video media playback. The electronic device assembly is also communicatively coupled to one or more peripheral devices, e.g., weather devices, speakers, memory card interfaces, thermostats, lights, and alarm systems. Exemplary peripheral devices can be any electronic device capable of sending and/or receiving data to and/or from the electronic device assembly. The electronic device assembly is further configured to provide interactive control of and display of data from the peripheral device. The electronic device assembly may also be configured to provide enterprise functionalities and control, such as building-specific or area-specific functions, information display, and control, via a peripheral device. Such enterprise functionality and control may be optionally accessed via voice/audio control functions. Optionally, an electronic device assembly provides an interactive experience that is tailored to particular users, or in the alternative, provides an interactive experience that is independent of the user.

A plurality of power and data units may be arranged throughout the work areas or other locations within a building. Such placement of electronic device assemblies in respective power and data units that were installed in separate locations (e.g., work areas) in a building, allows for a user to move within the building from work area to work area and access respective electronic device assemblies.

Referring now to FIG. 1, an exemplary extruded power and data housing unit 100 has openings 110 for receiving and supporting electrical or electronic power and/or data receptacles or functional modules, or for providing access to an interior of the power and data unit 100. The portion enclosed by circle "A" is enlarged (see "Enlargement A" in FIG. 1) to illustrate an exemplary opening 110, where an interior of the opening 110 includes a pair of grooves 112 configured to receive corresponding protrusions or ridges 204 formed on accessory device housings, such as found on an electronic device housing 202 of an electronic device assembly 200 (see FIG. 2, including "Enlargement B"). As will be described in subsequent paragraphs herein, and discussed in detail in commonly owned U.S. Pat. No. 8,480,429 issued to Norman R. Byrne, entitled "Power Data Housing" ("the '429 patent"), the disclosure of which is hereby incorporated herein by reference, the power and data housing unit 100 and other power and data housings provide for what can be characterized as receptacle, electrical component, or electronic device housings. Additional embodiments for an exemplary power and data housing are disclosed and discussed in detail in commonly owned U.S. Pat. No. 9,312,673 issued to Norman R. Byrne, entitled "Low Voltage Power Receptacle" ("the '673 patent"), the disclosure of which is hereby incorporated herein by reference.

The power and data housing unit 100 is capable of receiving various types of electrical components. As discussed in the '429 patent mentioned above, one such type of electrical component is a receptacle assembly. As illustrated in FIG. 1, an exemplary power receptacle assembly 120 may comprise a power receptacle housing 122 and a power receptacle 124. As also discussed in the '429 patent and the '673 patent, an exemplary data port assembly may comprise a data port receptacle and data port housing, while an exemplary high definition multi-media interface (HDMI) receptacle assembly may comprise an HDMI receptacle and HDMI housing.

As illustrated in FIG. 1, the openings 110 in the power and data housing unit 100 are configured to receive electronic device assemblies 200 via their respective housings 202. As illustrated in FIG. 1, and discussed herein, the power and data housing unit 100 is also configured to receive a variety of different accessory assemblies. The openings 110 illustrated in FIG. 1 may also contain receptacle assemblies, such as the above mentioned high-voltage AC outlet receptacles 124 and their housings 122. One or more of the receptacle assemblies 120 may be replaced with additional electronic device assemblies 200 and/or data port assemblies. The electronic device assembly 200 may be configured to interface with a portable computing device, such as a cellphone 300. As illustrated in FIG. 1, a display 210 of the electronic device assembly 200 may mirror a display 302 of the cellphone 300. Optionally, the display 302 of the cellphone 300 mirrors the display 210 of the electronic device assembly 200. Optionally, the electronic device assembly 200 does not interface with a portable computing device, but remains independent of any particular user or interfacing device.

Figure 2:
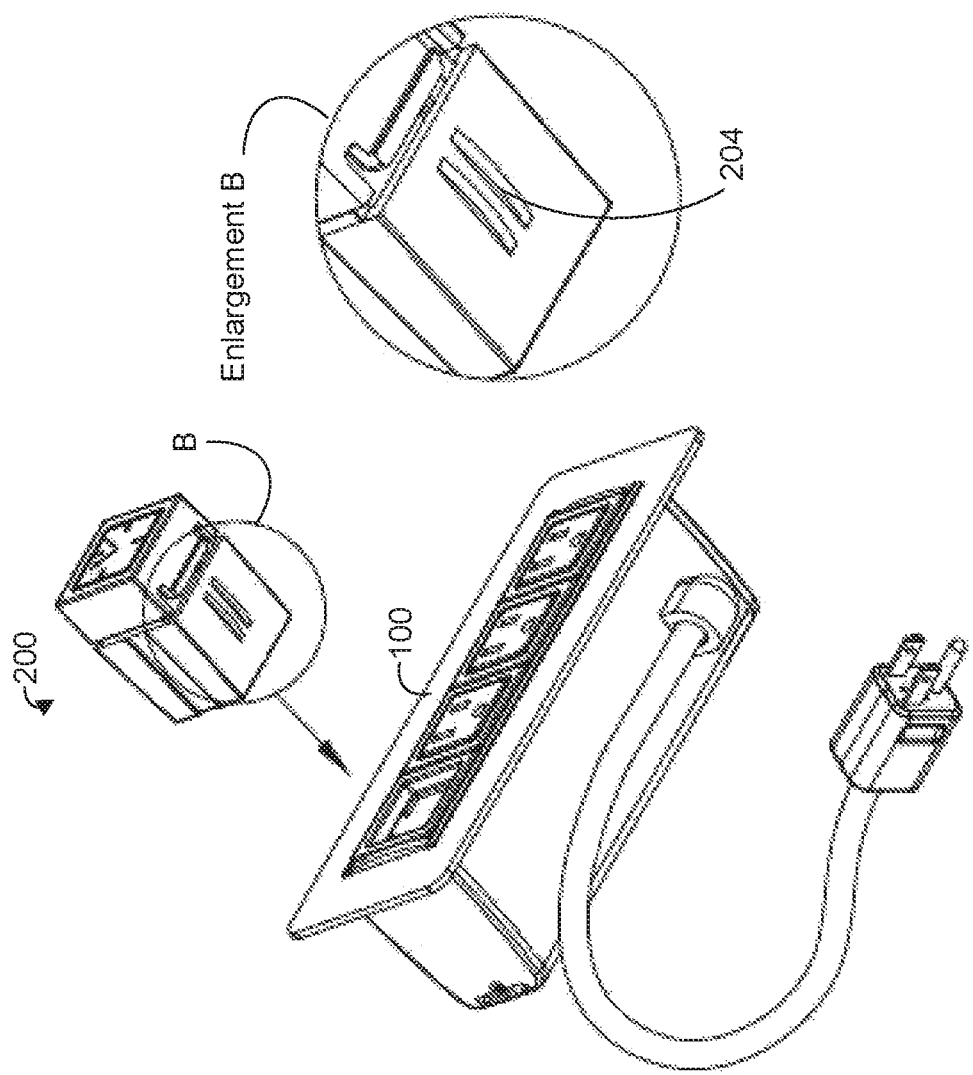
FIG. 2 is a perspective view of an electronic device assembly that inserts into an opening of the power and data housing of FIG. 1 in accordance with an embodiment of the present disclosure.

FIG. 2 illustrates a portion enclosed by a circle "B" that is enlarged (see "Enlargement B" in FIG. 2) to illustrate the corresponding protrusions or ridges 204 that mate with the grooves 112 found in the interior of the opening 110 of the power and data housing unit 100 illustrated in FIG. 1. As also illustrated in FIG. 1, the electronic device assembly 200 is configured to slide into the opening 110 of the power and data housing unit 100.

Figure 3:
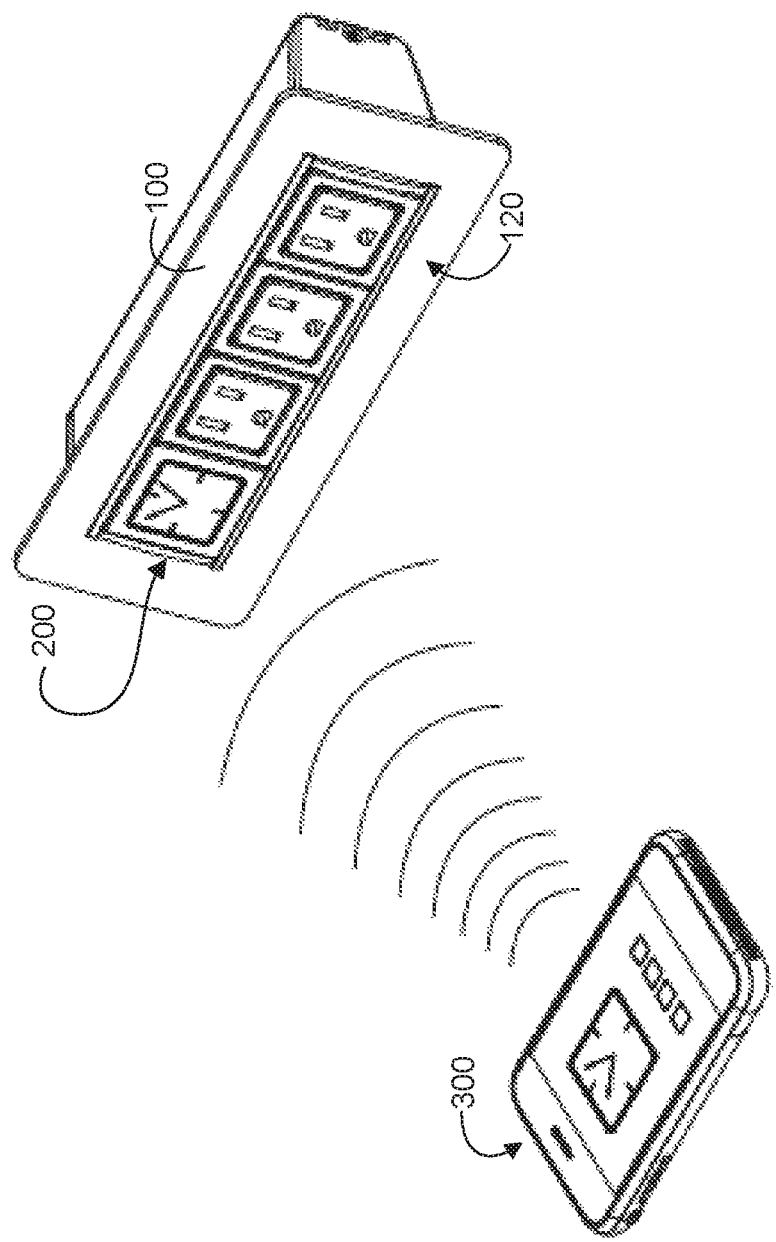
FIG. 3 is a perspective view of the power and data housing of FIG. 1, with an electronic device assembly inserted into the power and data housing and interfacing with a cellphone in accordance with an embodiment of the present disclosure.
Figure 4:
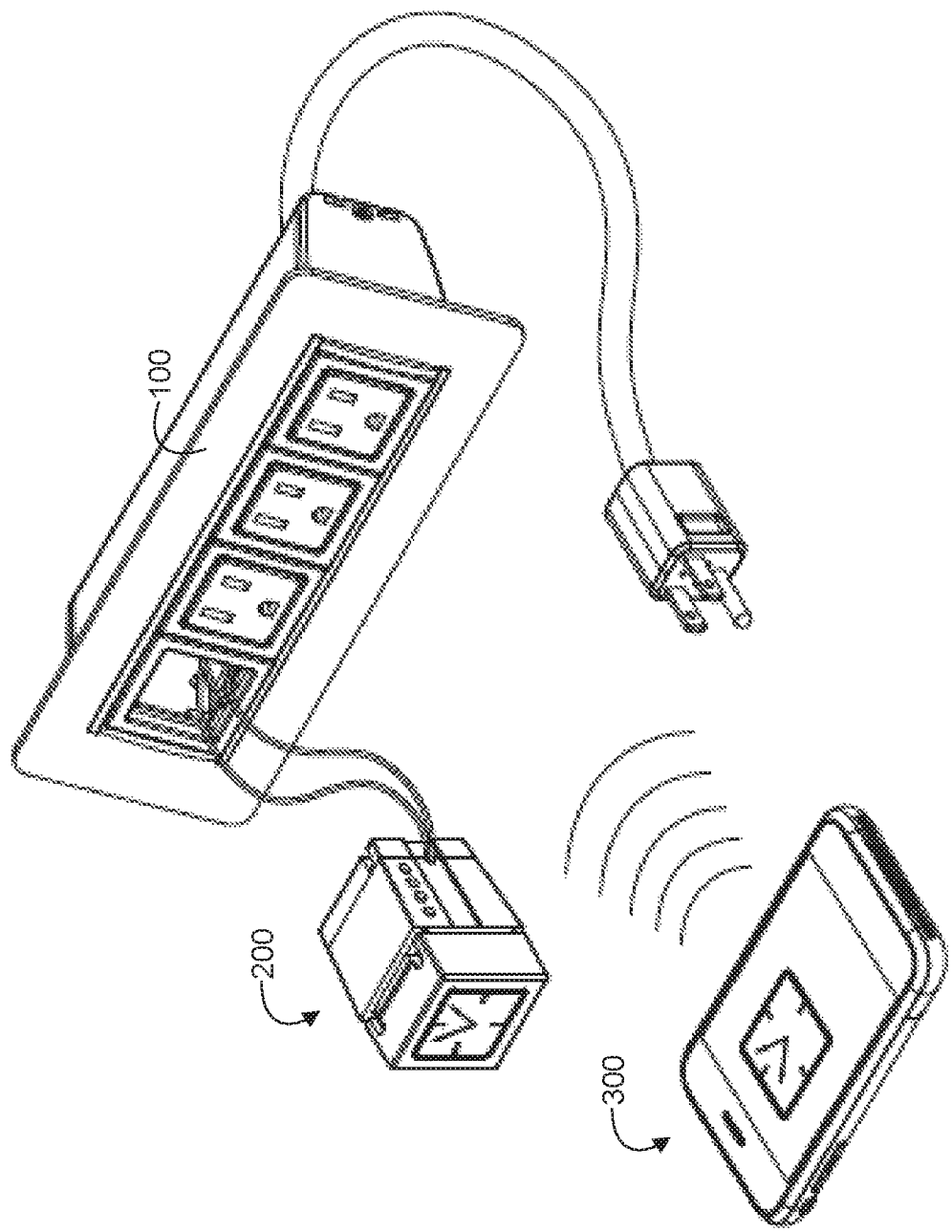
FIG. 4 is another perspective view of the power and data housing of FIG. 1, with an electronic device assembly connected to the power and data housing and interfacing with a cellphone in accordance with an embodiment of the present disclosure.

FIG. 3 illustrates another perspective view of the power and data housing unit 100 with an electronic device assembly 200 and several power receptacles 120. The electronic device assembly 200 interfaces with the cellphone 300 via one or more wireless communications links, such as Bluetooth, near field communications (NFC) and/or Wi-Fi network. Optionally, the cellphone 300 may be linked to the electronic device assembly 200 via a wired connection. As illustrated in FIG. 3, the display 210 of the electronic device assembly 200 mirrors the display 302 of the cellphone 300. As discussed herein, the display 302 of the cellphone 300 may optionally mirror the display 210 of the electronic device assembly 200. FIG. 4 illustrates a perspective view of the power and data housing unit 100 with the electronic device assembly 200 removed from the opening 110 while still wired to the power and data housing unit 100.

Figure 5:
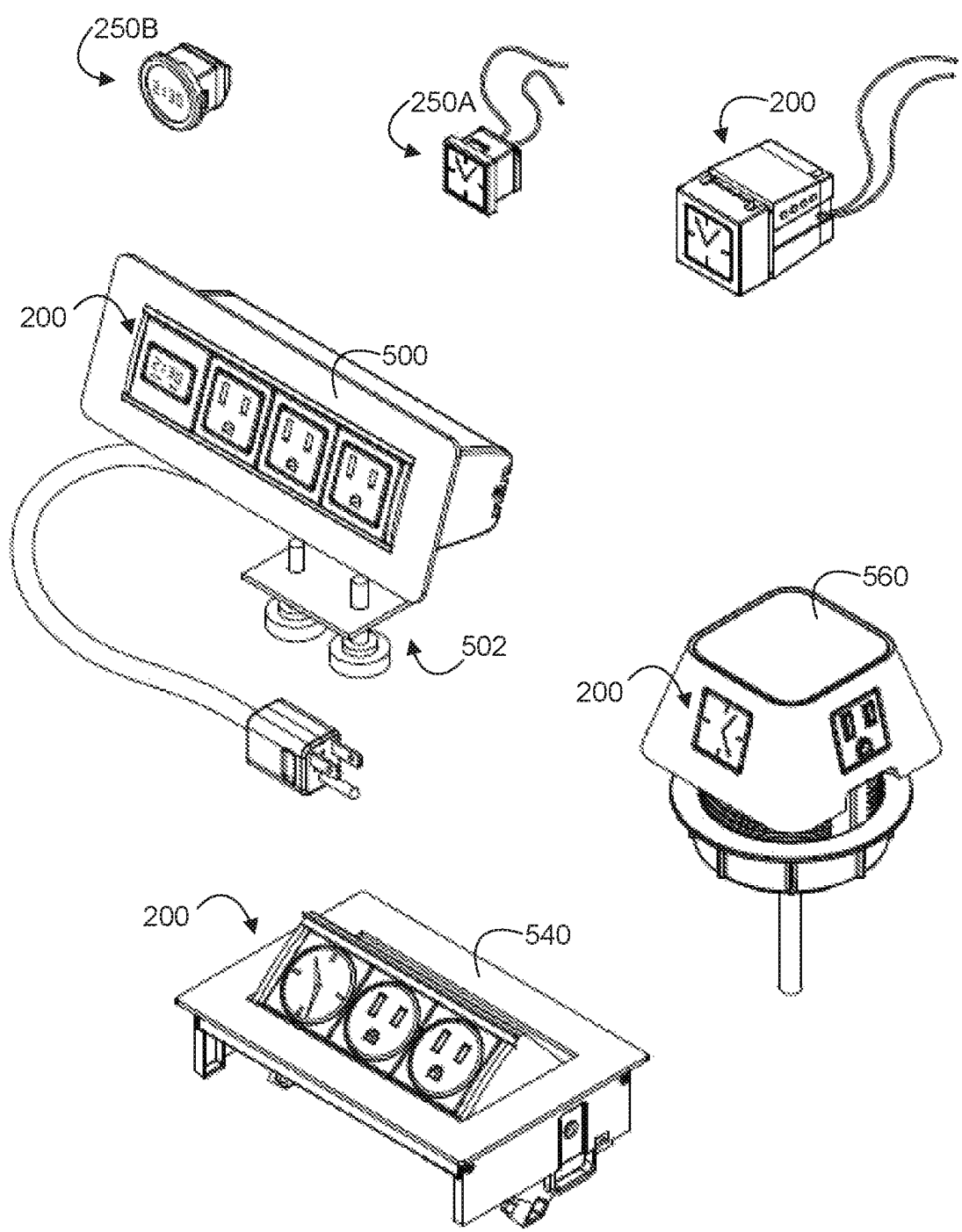
FIG. 5 is an additional perspective view of a variety of power and data systems in accordance with embodiments of the present disclosure.

As illustrated in FIG. 5, and discussed in the '673 patent, there are several possible configurations for a power and data housing unit 100. An exemplary power and data housing unit 500 may be configured with an edge clamp 502 for attaching to the edge of a table or desk surface. An exemplary power and data housing unit 540 may also be configured to be inserted into a horizontal tabletop surface. Lastly, an exemplary power and data housing unit 560 may be configured as a monument or monument-grommet mount for mounting in a horizontal surface of a work surface and/or tabletop. As also illustrated in FIG. 5, the electronic device assembly 200 may be configured into smaller housing units, such as electronic device assembly 250A and electronic device assembly 250B for configurations with increased volume restrictions. Optionally, the electronic device assembly 200 may be configured for a particular display 210 and associated electronics and their particular application(s) or functionalities. FIG. 5 also illustrates exemplary electronic device assemblies 200 retained and supported by respective power and data housing units (500, 560, and 540).

Figure 6:
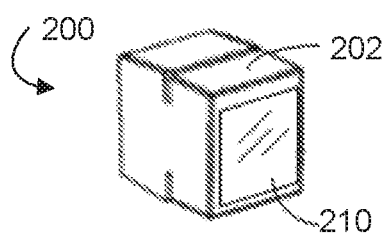
FIG. 6 is a perspective view of an electronic device assembly in accordance with an embodiment of the present disclosure.
Figure 7:
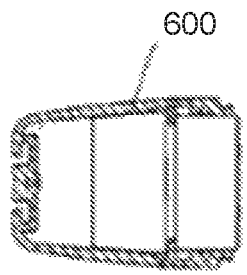
FIG. 7 is a side view of the electronic device assembly of FIG. 6 slidably inserted into a power and data housing in accordance with an embodiment of the present disclosure.
Figure 8:
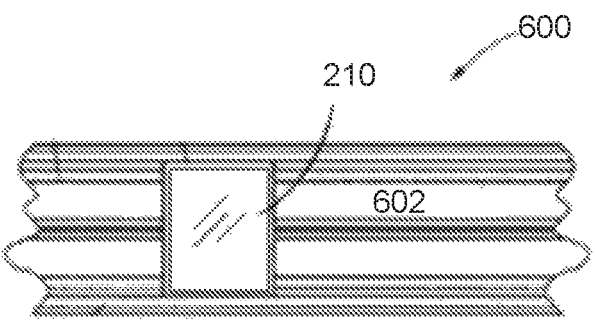
FIG. 8 is a front view of the electronic device assembly and the power and data housing of FIG. 7.

FIGS. 6-8 illustrate exemplary power and data housing unit 600 configured to receive electronic device assembly 200. FIGS. 6-8 illustrate the mating of electronic device assembly 200 with channel 602 of the power and data housing unit 600. For purposes of releasably securing the electronic device assembly 200 within the channel 602, the electronic device housing 202 may include additional appropriate components to be received within and captured by the upper and lower channels of the channel 602, such that the electronic device assembly 200 is slidably inserted into the channel 602. The above power and data housing unit 600 and channel 602 are discussed in detail in the '429 patent.

Figure 9:
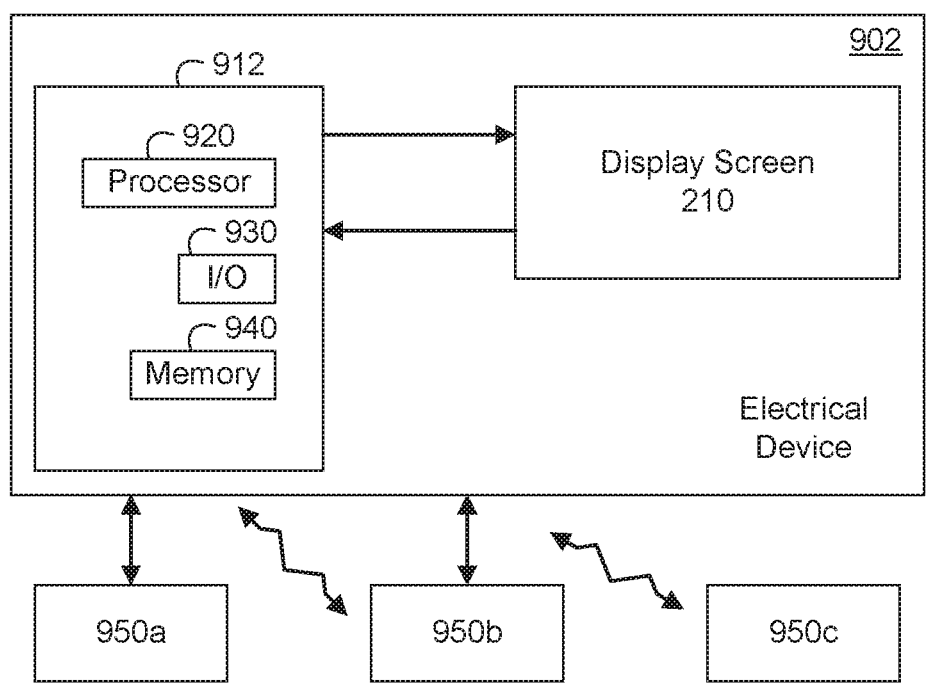
FIG. 9 is a block diagram of an electronic device assembly in accordance with an embodiment of the present disclosure

As illustrated in FIG. 9, an exemplary electronic device assembly 200 may comprise an electronic device 902 that includes a display screen 210 and associated electronics that may be implemented on a circuit board 912. As also illustrated in FIG. 9, the circuit board 912 may comprise a processor 920, an input/output (I/O) interface 930, and one or more memories 940. The display screen 210 may be a touch-sensitive screen to allow user interaction. Optionally, the electronic device assembly 200 may be substantially similar to an interactive smartwatch's display screen and associated electronics. The electronic device's display screen 210 may include a watch clock face display.

Optionally, an electronic device assembly 200 that includes an interactive display screen 210 and associated electronics 912, may include an interactive digital display capable of providing a combination of user-interactive functions that include, for example: text messaging, time-keeping, calendar functionalities, calculations, game-playing, and audio and/or video media players. Embodiments may also be capable of enterprise functionalities and control (e.g., building-specific or area-specific functions, information display, and control). In other words, the data output of the electronic device 902 may not be personal to an individual user. For example, the electronic device 902 may provide remote control functionality to a room's thermostat and lights or other similar enterprise functionalities.

Referring to FIG. 9, the electronic device assembly 902 may be wirelessly connectable to peripheral devices 950b, 950c, which may be substantially any sensor or control device. The electronic device assembly 902 may be wirelessly connectable via a Bluetooth, near field communication (NFC), and/or Wi-Fi connection(s). Such communications networks may also include Thread and/or Zigbee communications networks. Optionally, the electronic device 902 may also be wired and in communication with the peripheral devices 950a, 950b. The communications links of the electronic device assembly 902 may also interface with a portable computer device, such as a cellphone.

The peripheral devices 950a-c may be weather devices, such as thermometers, barometers, rain sensors, and wind sensors (e.g., wind speed, wind direction). The peripheral device 950a-c may also include speakers and memory card interfaces. As discussed herein, the peripheral devices 950a-c may also include thermostats, lights, and other remote functions (e.g., alarm systems). An exemplary peripheral device 950a-c may be any electronic device capable of sending and/or receiving data to and/or from the electronic device assembly 902.

The electronic device assembly 902 may be configured to serve as a remote control for the peripheral devices 950*a-c*. In other words, the electronic device assembly 902 provides an interactive control of one or more peripheral devices 950*a-c*. For example, the electronic device 902 may serve as a remote control for a thermostat, an alarm system, or room or building lighting. The remote functionality may be local (e.g., room lights, temperature control, room electronic or lighting systems), or building wide (e.g., alarm and security systems, climate control, and lighting).

Therefore, an exemplary electronic device assembly 200 in the form of an interactive display screen and associated electronics is communicatively coupled to at least one peripheral device. The electronic device assembly 200 is configured to provide interactive functions that include text messaging, time-keeping, calendar functions, calculations, game-playing, and audio/video media playback. The electronic device assembly 200 is further configured to provide interactive control of and display of data from the at least one peripheral device. The electronic device assembly 200 may also be configured to provide enterprise functionalities and control, such as building-specific or area-specific functions, information display, and control.

Figure 10:
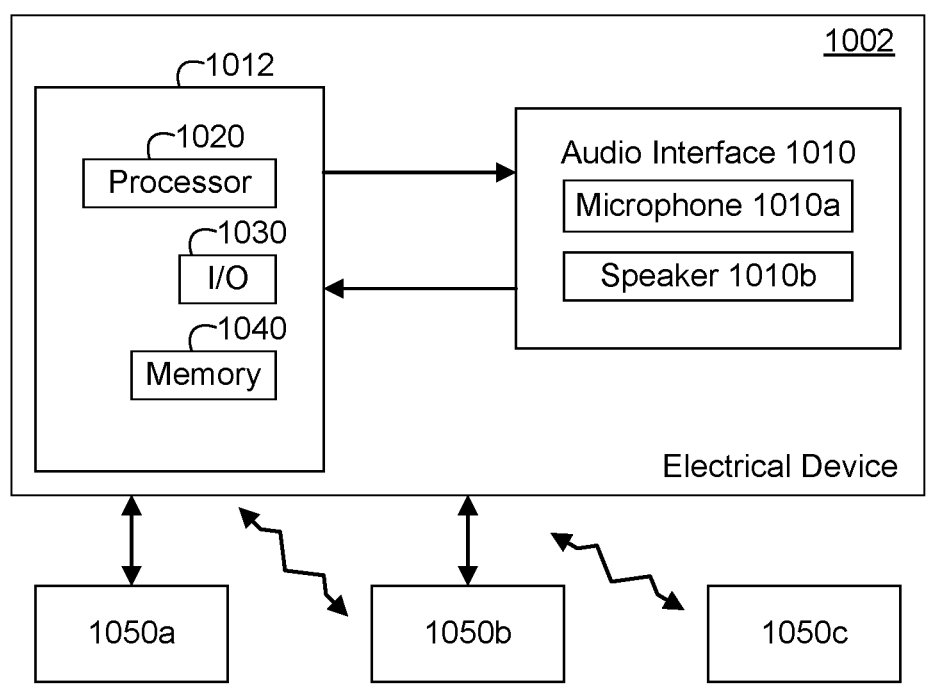
FIG. 10 is a block diagram of an electronic device assembly with a voice communications module in accordance with an embodiment of the present invention
Figure 11:
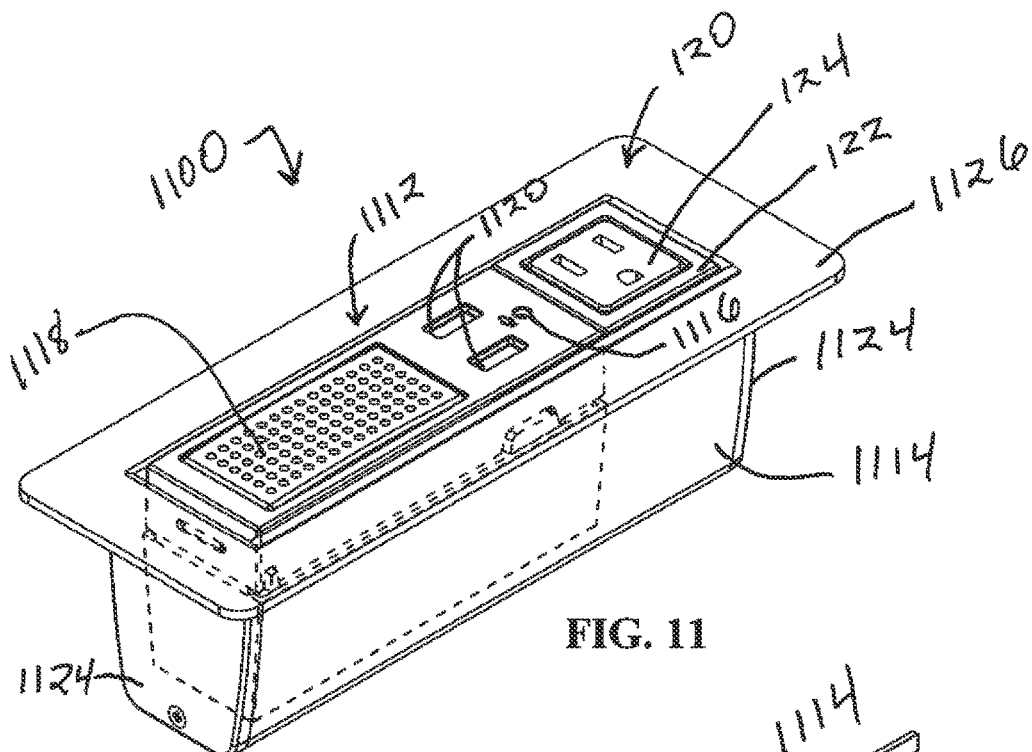
FIG. 11 is a perspective view of an electrical power unit with voice communications module in accordance with an embodiment of the present invention.

As illustrated in FIG. 10, an exemplary electronic device assembly 200 includes an electronic device in the form of an interactive voice communications module 1002 with an audio interface 1010 having a speaker 1010*a* and a microphone 1010*b*, and associated electronics that may be implemented on a circuit board 1012. As also illustrated in FIG. 10, the circuit board 1012 includes a processor 1020, an input/output (I/O) interface 1030, and one or more memories 1040. The audio interface 1010 is configured to provide an audio interaction as defined by vocalized speech of a user that is received by the microphone 1010*b* and processed by the processor 1020 of the voice communications module 1002. Optionally, the electronic device assembly 200 may include an interactive voice communications module 1002 and an interactive display screen 210 with the functionality described above.

The voice communications module 1002 is capable of receiving and processing voice commands (as provided by one or more users) and providing audible responses to the voice command using known algorithms and electronic communications technologies, such as those described in U.S. Pat. Nos. 7,177,798; 8,677,377; and 8,543,407, the disclosures of which are hereby incorporated herein by reference. For example, the microphone 1010*b* is configured to receive voice commands in the form of vocalized speech. Such vocalized speech is processed by the processor 1020 of the voice communications module 1002. Such processed vocalized speech may then be used to define audio outputs that are generated and output to the speaker 1010*a*. Such audio inputs and outputs may be received and output by the processor 1010 via the I/O interface 1030. Such processed vocalized speech may also be used to define control responses for controlling external peripheral devices. Such control responses may be digital commands communicated by the processor 1020 to the peripheral devices.

The processor 1010 is configured to provide an audio signal receiver/processor, as well as an audio signal generator. Such an audio signal receiver/processor, and an audio signal generator, are coupled to the I/O interface 1030 to send and receive such audio signals. The audio signals sent and received may include vocalized human speech as well as other audio-type signals. Therefore, the audio signal receiver/processor is configured to receive and process audio signals that are then used to define the audio outputs that are generated by the audio signal generator. As illustrated in FIG. 10, such audio signals are received by the microphone 1010*b* and transmitted by the speaker 1010*a* via the I/O interface 1030.

The interactive voice communications module 1002, with integrated speaker 1010*a* and microphone 1010*b*, and associated electronics 1012, enables an interactive audio interface capable of providing a combination of user-interactive functions (as defined by the processed vocalized speech) that include, for example: text messaging, time-keeping, calendar functionalities, calculations, game-playing, and/or audio media players. Embodiments may also be capable of enterprise functionalities and control (e.g., building-specific or area-specific functions, information reports, and control). In other words, the control data output of the electronic device (voice communications module) 1002 may not be personal to an individual user. For example, the electronic device 1002 may provide remote control functionality to a room's thermostat and lights or other similar enterprise functionalities. The electronic device 1002 may also provide audio outputs (via the speaker 1010*a*) that are defined by the processed vocalized speech as well as communicate data provided by one or more of the peripheral devices.

Referring to FIG. 10, the electronic device assembly 1002 may be wirelessly connectable to peripheral devices 1050*a*, 1050*b*, 1050*c*, which may be substantially any sensor or control device. The electronic device assembly 1002 may be wirelessly connectable via a Bluetooth, near field communication (NFC), and/or Wi-Fi connection(s). Such communications networks may also include Thread and/or Zigbee communications networks. Optionally, the electronic device 1002 may also be wired and in communication with the peripheral devices 1050*a*, 1050*b*, 1050*c*. The communications links of the electronic device assembly 1002 may also interface with a portable computer device, such as a cellphone.

The peripheral devices 1050*a-c* may be weather devices, such as thermometers, barometers, rain sensors, and wind sensors (e.g., wind speed, wind direction). The peripheral device 1050*a-c* may also include speakers and memory card interfaces. As discussed herein, the peripheral devices 1050*a-c* may also include thermostats, lights, and other remote functions (e.g., alarm systems). An exemplary peripheral device may be any electronic device capable of sending and/or receiving data to and/or from the electronic device assembly 1002. Optionally, communications with the peripheral devices 1050*a-c* may be conducted via the Internet.

The electronic device assembly 1002 may be configured to serve as a remote control for the peripheral devices 1050*a-c*. In other words, the electronic device assembly 1002 provides an interactive voice control of one or more peripheral devices 1050*a-c*. For example, the electronic device 1002 may serve as an audio enabled remote control for a thermostat, an alarm system, or room or building lighting. The remote functionality may be local (e.g., room lights, temperature control, room electronic or lighting systems), or building wide (e.g., alarm and security systems, climate control, and lighting). Optionally, the interactive audio system may further include a video output to a monitor or other video screen (such as display screen 210 or other video outputs). Therefore, the electronic device assembly 1002 provides audio outputs (via the speaker 1010*a*) and/or communicate digital commands to peripheral devices 1050*a-c* that are defined by the processed vocalized speech as well as data provided by the one or more of the peripheral devices 1050*a-c*.

Referring now to FIGS. 11-14, an exemplary electric power unit with voice communications capability 1100 includes an automated voice communications module 1112 that is supported in a housing 1114 configured to be mounted at or along a work surface. The voice communications module 1112 of FIG. 11 includes a microphone 1116, an audio speaker 1118, and a pair of low voltage DC power outlets 1120. The voice communications module 1112 may be used for playing music or other sounds that it receives from a wired or wireless connection to the Internet or other media source, which may include a portable electronic device such as a smart phone. The voice communications module 1112 may also be configured to provide audio outputs (via speaker 1118) and/or to communicate digital commands to external peripheral devices as defined by processed vocalized speech (received via the microphone 1116 and/or external peripheral devices). The voice communications module 1112 may also be configured to provide selective control of one or more receptacle assemblies 120 that are supported in the housing 1114, such as high-voltage AC outlet receptacles 124 or low-voltage USB outlets 1120. Such selective control of receptacle assemblies 120 allows for user control (such as voice control via the voice communications module 1112) of electrical or electronic devices plugged into the receptacle assemblies 120.

Figure 12:
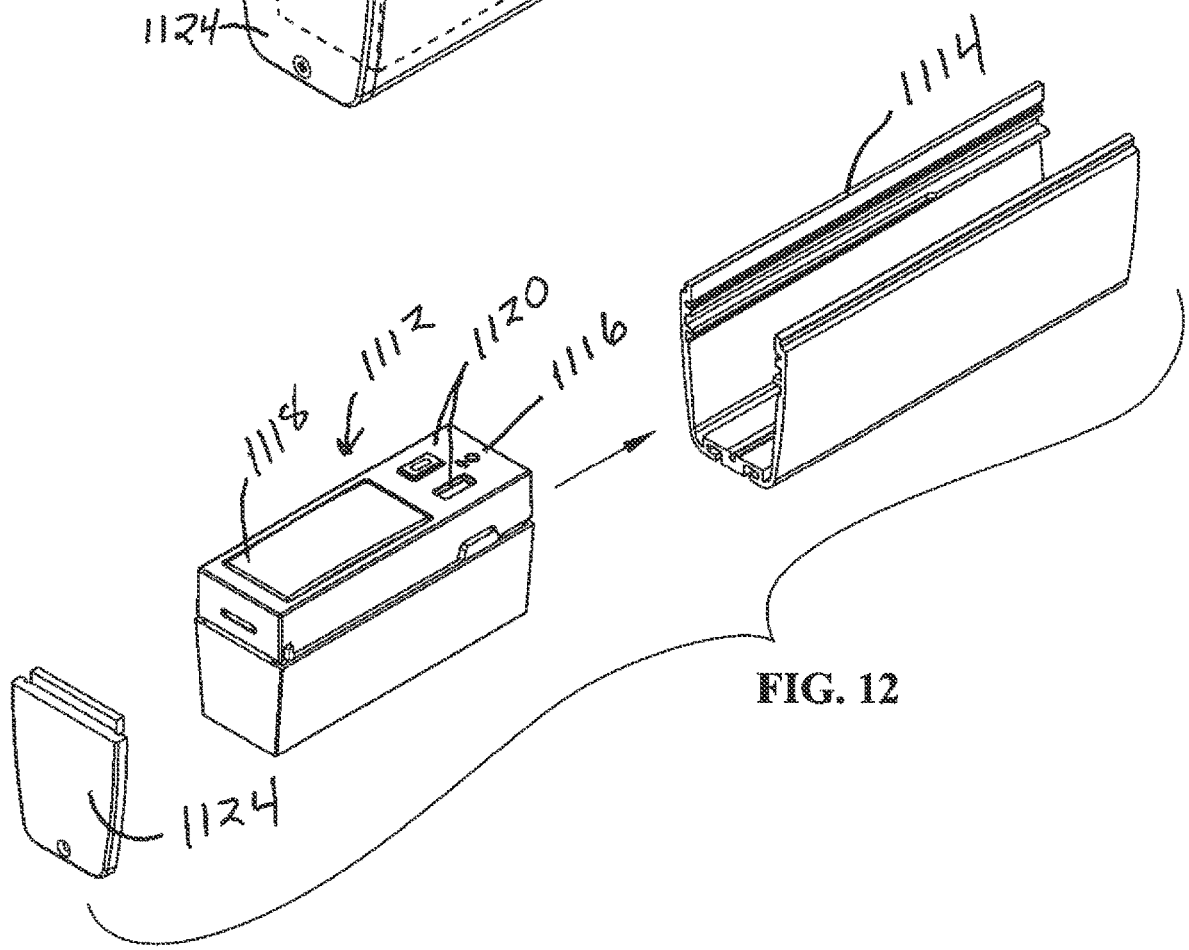
FIG. 12 is an exploded perspective view of the voice communications module and portions of the electrical power unit of FIG. 11.

As illustrated in FIG. 12, the automated voice communications module 1112 is supported at the housing 1114 along with a receptacle assembly 120 (such as a high-voltage AC outlet receptacle 124 and housing 122 discussed herein), and the housing 1114 is covered at its opposite ends by respective end caps 1124, which also secure the automated voice communications module 1112 and receptacle assembly 120 to the housing 1114. Housing 1114 may be substantially similar to power and data housings described in commonly-owned U.S. Pat. Nos. 8,480,429 and 9,312,673, which are hereby incorporated herein by reference in their entireties.

Electrical power unit 1100 includes a face plate or bezel 1126 that is coupled to housing 1114. Automated voice communications module 1112 may contain an electrical power converter, such as a DC power converter that receives a high voltage AC output and converts to a low voltage DC output at DC receptacles 1120. Automated voice communications module 1112, high-voltage AC outlet receptacles 124, and other electrical or electronic accessories may be inserted into and secured to housing 1114 in substantially the same manner that is described in the above-referenced commonly owned patents.

In an alternative arrangement, an electrical power and/or data unit 1300 is located at the end of a flexible cord 1340 and may be configured for an overhead hanging mount, such as shown in FIG. 13. The electrical power and/or data unit 1300 includes an automated voice communications module 1312 that may be functionally similar to the module 1112 described above. The automated voice communications module 1312 does not include its own electrical power outlets, but is mounted adjacent a pair of low voltage DC power outlets 1320 in the same housing 1314 that contains both the outlets 1320 and the module 1312. Housing 1314 is more fully described in commonly-owned U.S. provisional patent application, Ser. No. 62/621,575, filed Jan. 24, 2018, entitled "ELECTRICAL POWER AND DATA UNIT," which is hereby incorporated herein by reference in its entirety. As described above, the voice communications module 1312 also provides selective control of the low voltage DC power outlets 1320 supported by the housing 1314, such that user control (such as voice control via the voice communications module 1312) is provided for electrical or electronic devices plugged into the low voltage DC power outlets 1320.

In another alternative arrangement, an electrical power and/or data unit 1400 (FIG. 14) is configured for coupling to a work surface. The electrical power and/or data unit 1400 includes an automated voice communications module 1412 that may be functionally similar to the module 1312 described above. The automated voice communications module 1412 does not include its own electrical power outlets, but is mounted adjacent a set of receptacles 120 (e.g., high-voltage AC outlet receptacles) in the same housing 1414. As also described above, the voice communications module 1412 also provides selective control of the receptacles 120 supported by the housing 1414, such that user control (such as voice control via the voice communications module 1412) is provided for electrical or electronic devices plugged into the high-voltage AC outlets of the receptacles 120.

Figure 15:
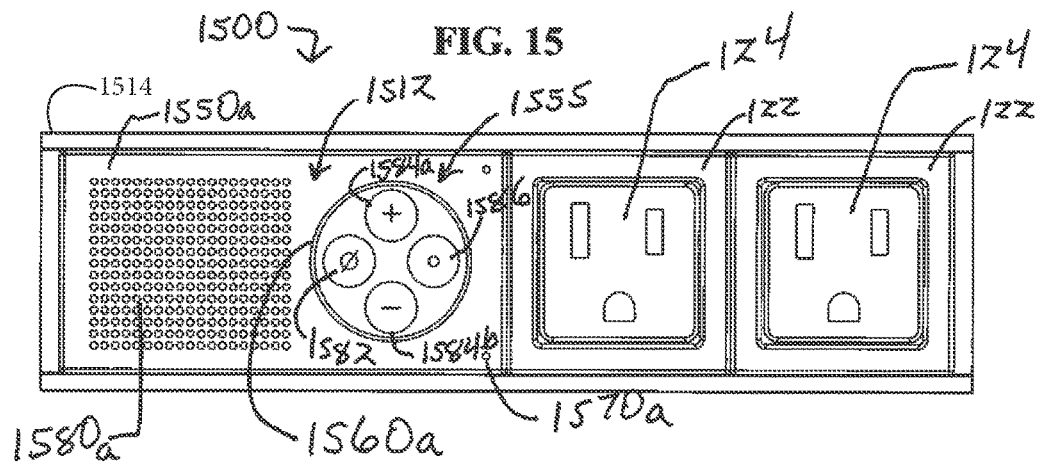
FIG. 15 is a front view of another electrical power unit with voice communications module in accordance with an embodiment of the present invention.
Figure 16:
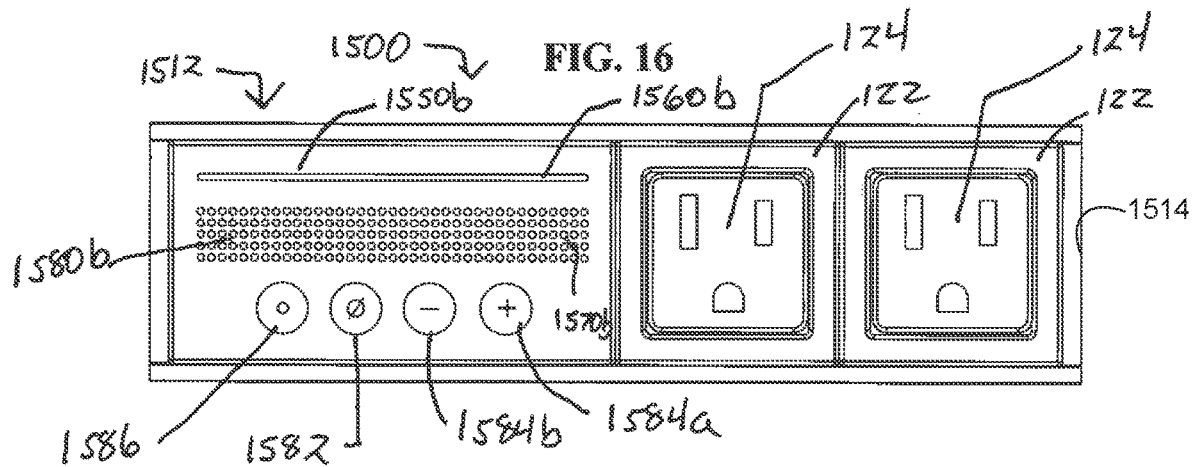
FIG. 16 is a front view of yet another electrical power unit with voice communications module in accordance with an embodiment of the present invention.
Figure 17:
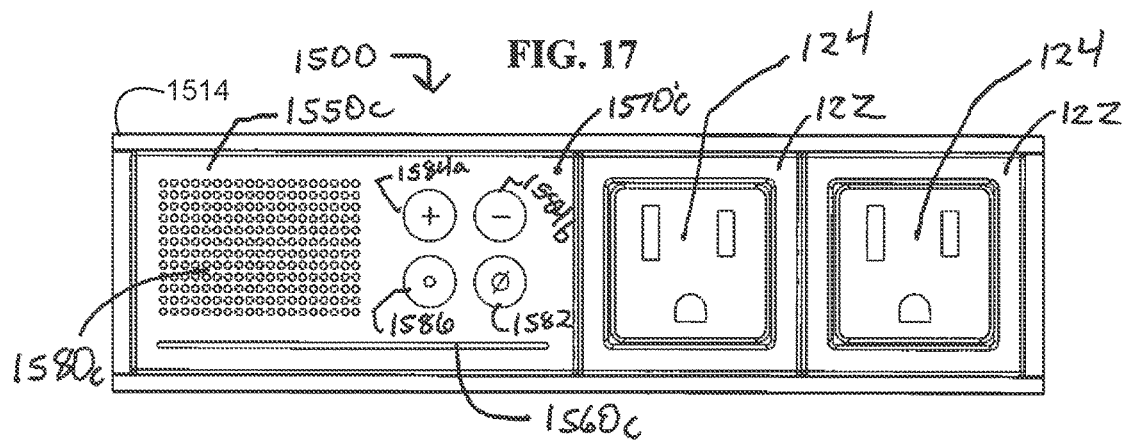
FIG. 17 is a front view of still another electrical power unit with voice communications module in accordance with an embodiment of the present invention.

Referring now to FIGS. 15-17, another exemplary electrical power and/or data unit with voice communications capability 1500 includes an automated voice communications module 1512 that may be functionally similar to the module 1112 described above. Mounted adjacent to the automated voice communications module 1512 are a pair of high-voltage AC outlet receptacles 124 and their housings 122. Other configurations are also possible, such as additional high-voltage AC outlet receptacles 124 and/or low voltage DC power outlets (1120). The voice communications module 1512 may be used for playing music or other sounds that it receives from a wired or wireless connection to the Internet or other media source, which may include a portable electronic device such as a smart phone. The voice communications module 1512 may also be configured to provide audio outputs (via speaker 1580) and/or communicate digital control commands to external peripheral devices as defined by processed vocalized speech (received via the microphone 1570 and/or external peripheral devices). Similarly, the voice communications module 1512 may also provide selective control of high-voltage AC outlet receptacles 124 or low voltage DC power outlets (1120) supported in the housing 1514. Such selective control of receptacle assemblies supported in the housing 1514 allows for user control (such as voice control via the voice communications module 1512) of electrical or electronic devices plugged into the high-voltage AC outlet receptacles 124 or low voltage outlets (1120).

As illustrated in FIGS. 15-17, the automated voice communications module 1512 may include a variety of different front panels 1550*a*-1550*c*. Each front panel 1550 includes a quartet of control buttons 1555 including a mute button 1582, volume buttons 1584*a*, 1584*b*, and an "action button" 1586. While each of the other buttons are self-explanatory, the action button 1586 may be considered a button used to activate or "wake up" the voice communications module 1512 or to start the module 1512 listening for an vocalized speech of a user. Each front panel 1550 also includes a function indicator light 1580 arranged as either a ring or a bar (see FIGS. 15-17). An exemplary function indicator light 1580 may be used to indicate a functional status of the voice communications module 1512. Such functional statuses may include "receiving audio signals," "processing vocalized speech," "receiving data from peripheral devices," "awake," and "asleep." Different colors may be used to indicate particular functional statuses. Optionally, an audio signal may be output by the speaker 1580 instead of or in additional to the function indicator light.

As shown in FIG. 15, front panel 1550a includes the quartet of control buttons 1555 arranged within a circular portion of the front panel 1550a that is surrounded by a function indicator light ring 1560a. The front panel 1550a also includes microphone inputs 1570a and a speaker 1580a. The quartet of control buttons 1555 includes a mute button 1582, volume buttons 1584a, 1584b, and an action button 1586.

As shown in FIG. 16, front panel 1550b includes the quartet of buttons 1555 arranged in a row, with a speaker 1580b and microphone inputs 1570b disposed between the quartet of control buttons 1555 and a function indicator light bar 1560b. As illustrated in FIG. 16, the quartet of control buttons 1555 includes the same mute button 1582, volume buttons 1584a, 1584b, and the action button 1586. As illustrated in FIG. 16, the volume buttons 1584a, 1584b are arranged on the right side of the front panel 1550b, with the action button 1586 and mute button 1582 arranged on the left side of the front panel 1550b.

In an alternative arrangement shown in FIG. 17, front panel 1550c includes the quartet of buttons 1555 arranged in a square configuration with a speaker 1580c disposed alongside the quartet of buttons 1555 and a function indicator light bar 1560c disposed below both the quartet of buttons 1555 and the function indicator light 1560c. As illustrated in FIG. 17, a microphone input 1570c is arranged in the upper right corner of the front panel 1550c. The volume buttons 1584a, 1584b are arranged above the action button 1586 and the mute button 1582.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A power and data housing assembly configured to support at least one electronic device, the power and data housing assembly comprising:
   a housing body configured for coupling to a work surface in a work area;
   at least one electrical receptacle retained and supported by said housing body;
   an electronic device assembly retained and supported by said housing body, said electronic device assembly comprising an interactive communications device having a front face and associated electronics, wherein a face of said electrical receptacle and said front face of said interactive communications device are oriented along respective parallel planes;
   wherein electronic device assembly is communicatively coupled to, and configured to remotely control, at least one peripheral device;
   wherein said interactive communications device is configured to provide interactive control of the at least one peripheral device; and
   wherein said interactive communications device and said associated electronics are operable to convey information that is communicated to said electronic device assembly from the at least one peripheral device.

2. The power and data housing assembly of claim 1, wherein said interactive communications device comprises a voice communications module comprising an audio speaker, a microphone, an audio signal receiver/processor, and an audio signal generator;
   wherein said audio signal receiver/processor is configured to receive and process vocalized speech from a user;
   wherein said voice communications module is configured to generate an audible response via said audio signal generator and said speaker, responsive to receiving and processing the vocalized speech from the user; and
   wherein said voice communications module is in electronic communication with a data source.

3. The electrical power unit of claim 1, wherein said at least one electrical receptacle comprises at least one of a high voltage AC power outlet and a low voltage DC power outlet.

4. The electrical power unit of claim 1, wherein said at least one electrical receptacle comprises at least one data port.

5. The electrical power unit of claim 2, wherein said voice communications module is configured to provide audio interaction as defined by the processed vocalized speech.

6. The electrical power unit of claim 5, wherein the audio interaction comprises at least one of: text messaging, time keeping, calendar functionalities, calculations, game-playing, audio-players, and video media players.

7. The electrical power unit of claim 2, wherein said voice communications module is communicatively coupled to, and configured to remotely control via communicated digital commands, at least one peripheral device.

8. The electrical power unit of claim 7, wherein said voice communications module is communicatively coupled to the at least one peripheral device via a wireless link, and wherein the wireless link comprises at least one of a Bluetooth connection, a near field communication (NFC) connection, a Thread connection, a Zigbee connection, and a Wi-Fi wireless connection.

9. The electrical power unit of claim 7, wherein said voice communications module is configured to provide interactive control of the at least one peripheral device via interactive audio interaction.

10. The electrical power unit of claim 7, wherein said voice communications module is configured to generate an audible response via said audio signal generator and said speaker, responsive to audio information defined by data received from the at least one peripheral device.

11. The electrical power unit of claim 2, wherein said voice communications module comprises a front panel, wherein said front panel comprises a microphone input for said microphone and a face of said audio speaker, each arranged on said front panel.

12. The electrical power unit of claim 11, wherein a face of said electrical receptacle and a face of said front panel of said voice communications module are oriented along respective parallel planes.

13. The electrical power unit of claim 11, wherein said front panel further comprises a command input button, a mute button, and a pair of volume control buttons.

14. The electrical power unit of claim 1, wherein said interactive communications device comprises an interactive display screen configured to convey information that is communicated to said electronic device assembly from the at least one peripheral device.

15. A method for providing interactive functionality between a peripheral device and an electronic device assembly retained and supported by a power and data housing assembly that is coupleable to a work surface in a work area, wherein the method comprises:
   communicating peripheral device configuration data from at least one peripheral device to the electronic device assembly;

providing one or more enterprise functions or controls via an interactive communications device at the electronic device assembly, based upon the configuration data communicated by the at least one peripheral device;

wherein said providing one or more enterprise functions or controls comprises providing interactive control of the at least one peripheral device, and further conveying information at the interactive communications device that is communicated from the at least one peripheral device, and remotely controlling the at least one peripheral device with the electronic device assembly; and wherein the power and data housing assembly retains and supports an AC electrical power output receptacle to orient a face of the AC electrical power output receptacle and a front face of the interactive communications device of the electronic device assembly along respective parallel planes.

16. The method of claim 15, wherein the interactive communications device is a voice communications module, and wherein said providing one or more enterprise functions or controls are provided via an input and a response, wherein the input is at least one of:

a digital input provided by at least one of the at least one peripheral device, and an audio input provided by a microphone of the voice communications module;

wherein the response is at least one of:

an audio response provided by an audio signal generator and an audio speaker of the voice communications module, and a control response provided by a processor of the voice communications module; and wherein the front panel of the interactive communications device comprises a microphone input for the microphone and a face of the audio speaker, each arranged on the front panel.

17. The method of claim 16 further comprising receiving and processing vocalized speech from a user, wherein the voice communications module is configured to generate an audible response via the audio signal generator and the audio speaker, responsive to the processed vocalized speech, and wherein the voice communications module is further configured to generate a control response responsive to the processed vocalized speech.

18. The method of claim 16, wherein the at least one peripheral device includes at least one of: a handheld computer, a thermometer, a barometer, a rain sensor, a wind sensor, a thermostat, a lighting control, an audio speaker, and a memory card interface.

19. The method of claim 18, wherein the method further provides additional interactive control and information flow at the voice communications module, the additional interactive control and information flow comprising one or more functions, the one or more functions comprising text messaging, time-keeping, calendar functionality, calculations, game-playing, audio playback, and video media playback and control.

20. The method of claim 15, wherein the interactive communications device comprises an interactive display screen conveying information that is communicated to the electronic device assembly from the at least one peripheral device.

* * * * *